United States Patent
Hallifax et al.

(10) Patent No.: US 12,515,060 B1
(45) Date of Patent: Jan. 6, 2026

(54) ELECTRICAL ENERGY POWER SOURCE CONNECTED TO AN ACTIVE MEDICAL DEVICE THROUGH A FLEX CIRCUIT

(71) Applicant: Greatbatch Ltd., Clarence, NY (US)

(72) Inventors: Paul T. Hallifax, Gasport, NY (US); Jordan A. Hartwig, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 393 days.

(21) Appl. No.: 18/105,062

(22) Filed: Feb. 2, 2023

Related U.S. Application Data

(60) Provisional application No. 63/306,705, filed on Feb. 4, 2022.

(51) Int. Cl.
| | |
|---|---|
| *A61N 1/378* | (2006.01) |
| *H02J 7/00* | (2006.01) |
| *H02J 50/00* | (2016.01) |
| *H02J 50/10* | (2016.01) |
| *H02J 50/20* | (2016.01) |

(52) U.S. Cl.
CPC .......... *A61N 1/3787* (2013.01); *H02J 7/0042* (2013.01); *H02J 50/005* (2020.01); *H02J 50/10* (2016.02); *H02J 50/20* (2016.02)

(58) Field of Classification Search
CPC .................. A61N 1/375; A61N 1/3968; A61N 2005/0632
See application file for complete search history.

(56) References Cited

U.S. PATENT DOCUMENTS

| | | |
|---|---|---|
| 8,790,819 B1 | 7/2014 | Freitag et al. |
| 2007/0073360 A1* | 3/2007 | He .................. A61N 1/3605 607/1 |

* cited by examiner

*Primary Examiner* — Tammie K Marlen
(74) *Attorney, Agent, or Firm* — Michael F. Scalise

(57) ABSTRACT

An active medical device comprises an electrical energy power source powering a medical device. The power source has an open-ended casing that is hermetically sealed with a glass-to-metal seal (GTMS) supported in a lid closing the casing. The medical device has an open-ended housing that houses a PCB assembly which is configured to control functions of the active medical device. A sleeve provides a sleeve lumen, and a flex circuit resides inside the sleeve lumen. The flex circuit inside the sleeve lumen is connected to the power source and to the PCB assembly to power the active medical device, and the sleeve is connected to the medical device housing at the housing open end and to the power source casing adjacent to the lid supporting the GTMS to hermetically seal the active medical device.

20 Claims, 4 Drawing Sheets

ELECTRICAL ENERGY POWER SOURCE CONNECTED TO AN ACTIVE MEDICAL DEVICE THROUGH A FLEX CIRCUIT

CROSS-REFERENCE TO RELATED APPLICATION

This application claims priority to U.S. Provisional Application Ser. No. 63/306,705, filed on Feb. 4, 2022.

BACKGROUND OF THE INVENTION

1. Field of the Invention

The present invention relates to the field of implantable medical devices. More particularly, the present invention relates to an active medical device that is designed to deliver electrical stimulation to a patient or sense biological signals from body tissue.

2. Prior Art

U.S. Pat. No. 8,790,819 to Freitag et al., which is assigned to the assignee of the present invention and incorporated herein by reference, relates to an implantable medical assembly comprising a medical device powered by an electrochemical cell. When implanted, both the electrochemical cell and the medical device are exposed to body fluids. The medical device, which houses electrical circuits, includes an open end having a perimeter edge closed by a housing tube and a contact plate. The electrochemical cell has a casing extending to a proximal end forming a proximal opening. The proximal casing end is joined to the medical device housing to form the prior art implantable medical assembly.

To power the medical device, a glass-to-metal seal (GTMS) of the cell supports a terminal pin extending from within the cell casing, through the proximal casing opening and into the contact opening in the housing tube of the device housing. The contact plate connected to the housing tube is also connected to the electrical circuits contained within the device housing. The terminal pin extending outwardly from the GTMS of the electrochemical cell is connected to the electrical circuits of the medical device through a conductive spring that bias between the contact plate and the terminal pin.

While the implantable medical assembly described by the '819 patent to Freitag et al. functions well for its intended purpose, there is a desire to replace the coil spring with a flex circuit for electrically connecting a medical device to its electrical energy power source. Not only does the flex circuit eliminate the coil spring, but it also provides greater flexibility in adapting the size of the active medical device to a customer's particular application.

Moreover, the glass-to-metal seals (GTMS) used in the various electrochemical cells that are commercially available from Greatbatch Ltd., Clarence, New York, which is the assignee of the present invention, are not specified for exposure to bodily fluids. Exposing the GTMS for the electrochemical cell in a conventional active implantable medical device is generally not a concern. That is because the electrochemical cell is hermetically sealed inside the medical device so that the device housing prevents body fluids, and the like, from contacting the GTMS for the cell.

In that respect, there is a desire to provide an active medical device where both the electrochemical cell and the powered medical device are contactable by body fluids, but without the GTMS for the cell being exposed to body fluids.

SUMMARY OF THE INVENTION

The design of the present active medical device accomplishes this by connecting a flex circuit to an electrical energy power source for the medical device. The flex circuit and its connections to the GTMS for the electrical energy power source and to the printed circuit board (PCB) assembly for the medical device are hermetically sealed inside a sleeve that connects to the power source and to the medical device. Not only does the sleeve protect the flex circuit and its connections to the electrical power source and the medical device from contacting body fluids, and the like, it lengthens the path that moisture must take to reach the GTMS and the PCB assembly should hermeticity be breached for some unforeseen reason.

These and other aspects of the present invention will become increasingly more apparent to those skilled in the art by reference to the following detailed description and to the appended drawings.

DETAILED DESCRIPTION OF THE PREFERRED EMBODIMENTS

As described in the present specification, the term "active medical device" refers to a medical device that is powered by an electrical energy power source and that can be implanted in a patient's body tissue or worn externally on the body. The active medical device is configured to either provide electrical stimulation to body tissue in which it is implanted or to body tissue on which it is externally worn, or to sense biological signals from adjacent body tissue in which it is implanted or from body tissue on which it is externally worn. The active medical device can also be configured to both provide electrical stimulation and sense biological signals to and from body tissue in which it is implanted or on which it is worn.

As described in the present specification, a flex circuit is an elongate and conformable electronic assembly that is comprised of at least two electrically-conductive and spaced-apart traces that are supported on a flexible and insulative substrate. The flex circuit can be bent and twisted into unique shapes with the substrate maintaining the at least two conductive traces electrically isolated from each other. The opposed ends of the conductive traces are connected to bond tabs supported on the insulative substrate or the traces are connected to holes in the substrate. The bond tabs or holes are configured to electrically connect to terminal pins extending from a PCB assembly of the medical device and to a terminal pin and casing for the electrical energy power source. With the exception of the connection bond tabs or the connection holes, the entire flex circuit is also insulated so the electrical traces cannot contact the electrical energy power source and the medical device.

Figure 1:
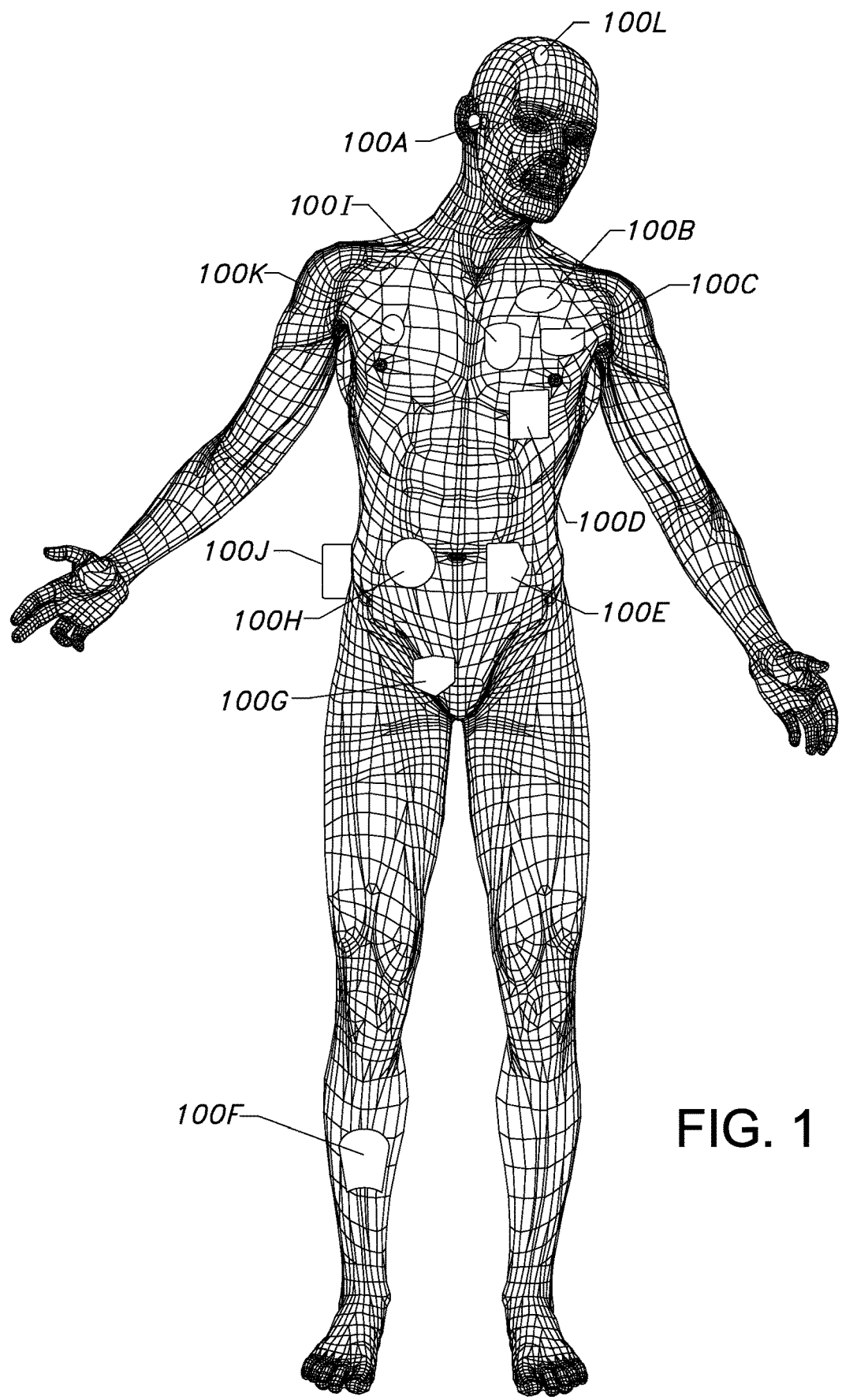
FIG. 1 is a wire formed diagram of a generic human body showing a number of medical devices 100A to 100L according to the present invention that can either be implanted in a patient's body tissue or attached externally to the body.

Turning now to the drawings, FIG. 1 is a wire form diagram of a generic human body illustrating various types of active implantable and external medical devices according to the present invention that can either be implanted in a patient's body or attached externally to the body.

Numerical designation 100A represents a family of hearing devices which can include the group of cochlear implants, piezoelectric sound bridge transducers, and the like.

Numerical designation 100B represents a variety of neurostimulators, brain stimulators, and brain sensors. Neurostimulators are used to stimulate the Vagus nerve, for example, to treat epilepsy, obesity, and depression. Brain stimulators are pacemaker-like devices and include electrodes implanted deep into the brain for sensing the onset of a seizure and also for providing electrical stimulation to brain tissue to prevent a seizure from actually occurring. If present, the lead wires associated with a deep brain stimulator are often placed using real time MRI imaging. Sensors include optical sensors, motion sensors, acoustic sensors, pressure sensors, analyte sensors, and electromagnetic sensors, among others.

Numerical designation 100C shows a cardiac pacemaker which is well-known in the art.

Numerical designation 100D includes the family of left ventricular assist devices (LVADs) and artificial heart devices.

Numerical designation 100E includes a family of drug pumps which can be used for dispensing insulin, chemotherapy drugs, pain medications, and the like.

Numerical designation 100F includes a variety of bone growth stimulators for rapid healing of fractures.

Numerical designation 100G includes urinary incontinence devices.

Numerical designation 100H includes the family of pain relief spinal cord stimulators and anti-tremor stimulators.

Numerical designation 100H also includes an entire family of other types of neurostimulators used to block pain.

Numerical designation 100I includes both implantable cardioverter defibrillator (ICD) devices and congestive heart failure devices (CHF). These are known in the art as cardio resynchronization therapy devices, otherwise known as CRT devices.

Numerical designation 100J illustrates an externally worn pack. The pack could be an external insulin pump, an external drug pump, an external neurostimulator or even a ventricular assist device.

Numerical designation 100K illustrates one of various types of EKG/ECG external skin electrodes which can be placed at various external locations on the body.

Numerical designation 100L represents external EEG electrodes that are placed on the head.

Figure 2:
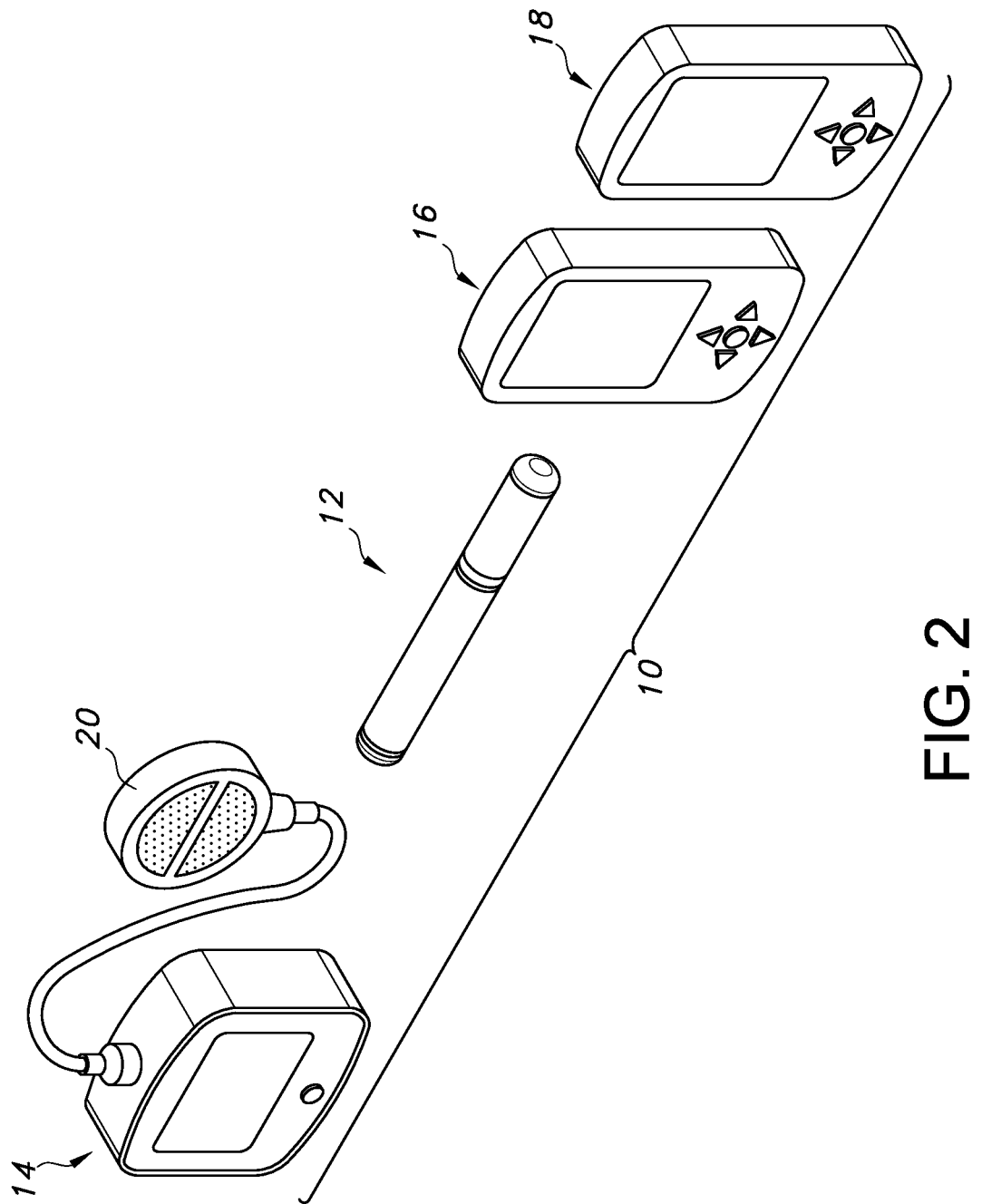
FIG. 2 is a simplified block diagram of an exemplary medical system 10 according to various embodiments of the present invention.

To provide context to the various active medical devices 100A to 100L illustrated in FIG. 1, FIG. 2 illustrates a simplified block diagram of an exemplary medical system 10 according to the present invention. The medical system 10 includes an active medical device 12, which is any one of the various medical devices 100A to 100L illustrated in FIG. 1 and which can be implanted in a patient's body tissue or worn externally on the body. In that respect, while the active medical device 12 is shown as an elongate device, the shape of the medical device 12 is not limited to the elongate shape that is shown. For example, the active medical device 12 can have a cylindrical shape or a shape that is not elongated.

The medical system 10 also has an external charger 14, a patient programmer 16, and a clinician programmer 18. The patient programmer 16 and the clinician programmer 18 may be portable handheld devices, such as a smartphone or other custom device, that are used to configure the active medical device 12 so that the medical device can operate in a desired manner. The patient programmer 16 is used by the patient in whom the active medical device 12 is implanted or on whom the active medical device is externally worn. The patient may adjust the parameters of electrical stimulation delivered by the active medical device 12, such as by selecting a stimulation program, changing the amplitude and frequency of the electrical stimulation, among other parameters, and by turning stimulation on and off. Additionally, the patient programmer 16 may collect and or display data being collected by the active medical device 12 and alert the patient to potential health risks.

The clinician programmer 18 is used by medical personnel to configure the other system components and to adjust stimulation parameters that the patient is not permitted to control. These include setting up stimulation programs among which the patient may choose and setting upper and lower limits for the patient's adjustments of amplitude, frequency, and other parameters. Although FIG. 2 illustrates the patient programmer 16 and the clinician programmer 18 as two separate devices, they may be integrated into a single programmer in some embodiments.

Electrical power may be delivered to the active medical device 12 through an external charging pad 20 that is connected to the external charger 14. The external charging pad 20 is configured to charge a rechargeable electrical energy power source 24 (FIGS. 3A, 3B and 5) through a charging coil (not shown) connected to a charging circuit (not shown) of the active medical device 12.

The external charging pad 20 can be a hand-held device that is connected to the external charger 14, or it can be an internal component of the external charger. The external charger 14 and the charging pad 20 can also be integrated into a single device that is strapped on or attached to the patient with adhesive.

Figure 3A:
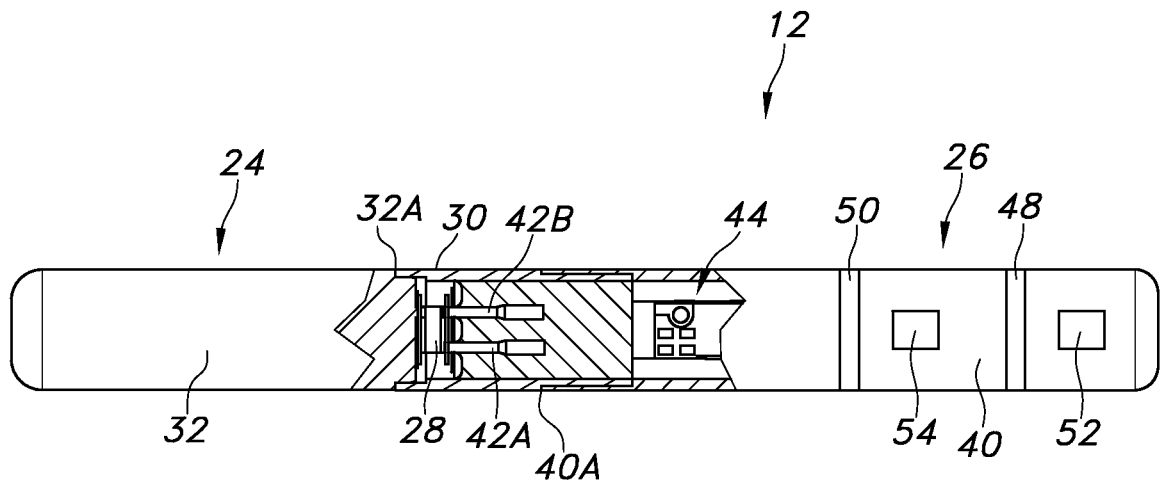
FIG. 3A is a side elevation view, partly broken away, of an electrical energy power source 24 electrically connected to a medical device 26 by an intermediate flex circuit 28.
Figure 3B:
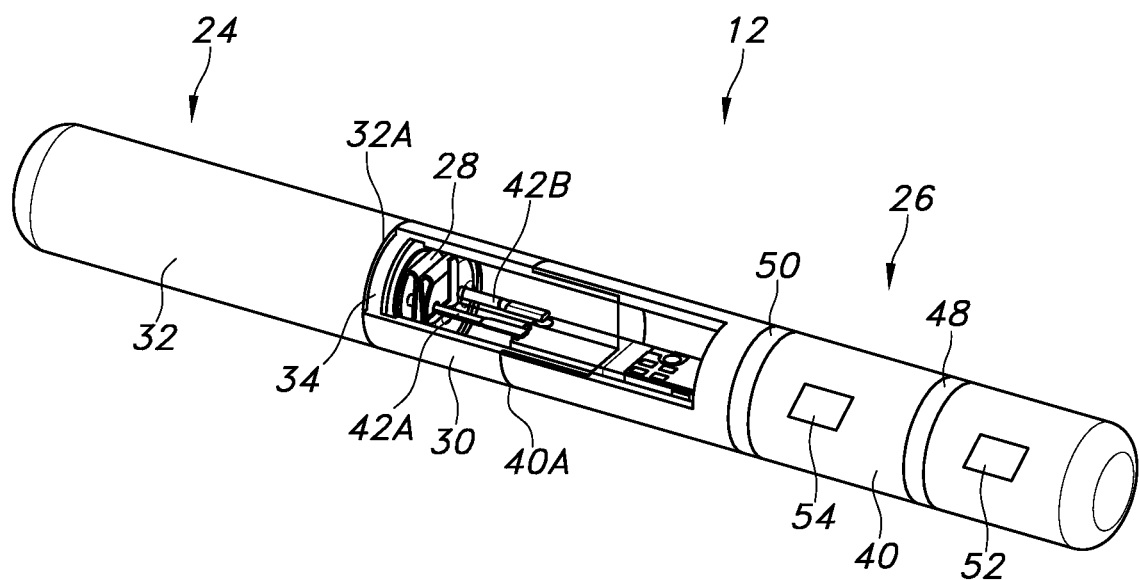
FIG. 3B is a perspective view of the electrical energy power source 24 electrically connected to the medical device 26 shown in FIG. 3A.
Figure 5:
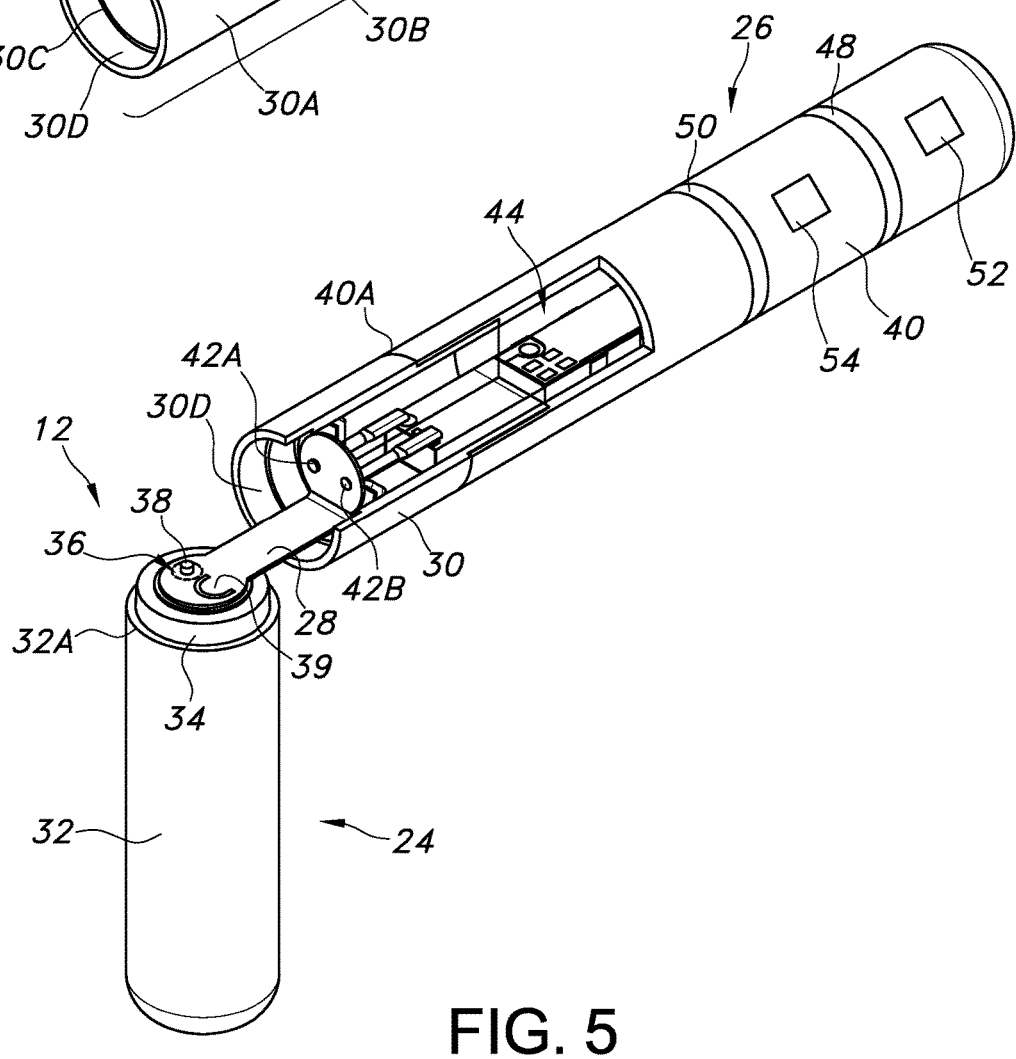
FIG. 5 is a perspective view of the sleeve 30 connected to the medical device 26 shown in FIG. 4 and with the electrical energy power source 24 electrically connected to the medical device 26 through the flex circuit 28, but before the power source is connected to the sleeve 30.

Referring now to FIGS. 3A, 3B and 5, they illustrate an exemplary embodiment of the active medical device 12 shown in the exemplary medical system 10 (FIG. 2) according to the present invention that can be either implanted in a patient's body tissue or worn externally on the body. The active medical device 12 comprises an electrical energy power source 24 that provides electrical power to a medical device 26 through a flex circuit 28. It is the power source 24 electrically connected to the medical device 26 which makes the medical device an active medical device 12. The flex circuit 28 electrically connecting the power source 24 to the medical device 26 is housed inside a sleeve 30 rigidly connecting the electrical energy power source 24 to the medical device 26.

The electrical energy power source 24 can be a capacitor or a rechargeable electrochemical cell, for example a hermetically sealed rechargeable Li-ion electrochemical cell. However, the electrical energy power source 24 is not limited to any one chemistry or even a rechargeable chemistry and can be of an alkaline cell, a primary lithium cell, a rechargeable lithium-ion cell, a Ni/cadmium cell, a Ni/metal hydride cell, a supercapacitor, a thin film solid-state cell, and the like. Preferably, the electrical energy power source 24 is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The electrical energy power source 24 can also be a solid-state thin film electrochemical cell having a lithium anode, a metal-oxide based cathode and a solid electrolyte, such as an electrolyte of LiPON ($Li_xPO_yN_z$).

In that respect, the electrical energy power source 24 as a hermetically sealed electrochemical cell or capacitor comprises a casing 32, which can be metal or ceramic. If metal, titanium is preferred. If ceramic, an essentially high purity alumina is preferred. Whether metal or ceramic, the power source casing 32 has a surrounding sidewall extending to a proximal annular rim 32A. The proximal rim 32A is hermetically sealed to a metallic lid 34. Titanium is a preferred metal for the casing 32 and the lid 34. If the casing 32 for the power source 24 is metal, the lid 34 is attached to the proximal rim 32A of the power source casing 32 by a welding process, for example by laser welding.

Alternatively, if the casing 32 for the power source 24 is of a ceramic material, the lid 34 is hermetically secured to the proximal rim 32A by a brazing process in which the rim 32A is provided with a metallization (not shown). A suitable metallization comprises two metallization layers, a first adhesion layer that is directly applied to the outwardly facing edge of the rim 32A, and a second, wetting layer, which is applied on top of the adhesion layer. In a preferred embodiment, the adhesion layer is titanium, and the wetting layer is either molybdenum or niobium. However, for the sake of simplicity, the adhesion and wetting layers are intentionally not shown. A gold ring-shaped preform (not shown) is seated on the metallized proximal rim 32A, and the ceramic power source casing 32/gold pre-form/lid 34 assembly is then subjected to a brazing process, as is well known to those skilled in the art related to brazing a ceramic material to a metallic flange. The brazing process melts the gold to thereby form a hermetic seal joining the lid 34 to the ceramic casing 32 at the proximal annular rim 32A.

As shown in FIG. 5, the lid 34 has an opening in which a glass-to-metal seal (GTMS) 36 is hermetically secured. The lid 34 and GTMS 36 close the proximal open end of the casing 32. As is also well known by those skilled in the art, the GTMS 36 supports an insulator glass (not shown) that seals between a ferrule (not shown) or the lid 34 and at least one terminal pin 38. The insulator glass is of a corrosion resistant type having up to about 50% by weight silicon such as CABAL 12, TA 23, FUSITE 425 or FUSITE 435. The terminal pin 38 is of molybdenum, aluminum, nickel alloy, or stainless steel, the former being preferred.

The flex circuit 28 also has a bond tab 39, which, if the power source 24 is constructed in a case-negative design, is electrically connected to the lid 34. The lid 34 is in electrical continuity with the casing 32.

Figure 4:
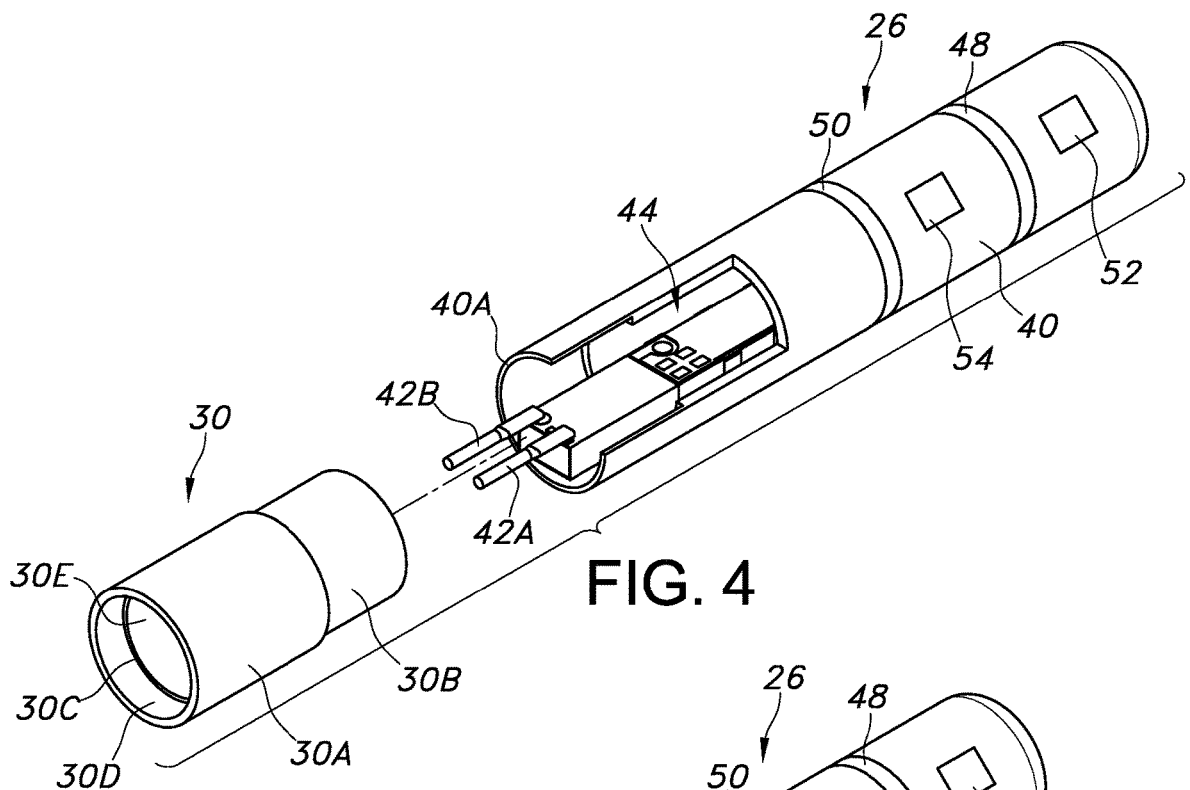
FIG. 4 is a perspective view of a sleeve 30 before it is connected to the medical device 26 shown in FIGS. 3A and 3B.

As shown in FIG. 4, the sleeve 30 is a cylindrically-shaped member made from a metal material, preferably titanium. The sleeve 30 forms a cylindrically-shaped lumen that extends from a power source sleeve portion 30A having a first outer diameter connected to a device sleeve portion 30B having a second outer diameter. The first outer diameter is greater than the second outer diameter.

As further shown in FIG. 4, the power source sleeve portion 30A has an internal rim that forms an annular step 30C from a proximal lumen section 30D having a third inner diameter to a distal lumen section 30E having a fourth inner diameter. The fourth inner diameter is less than the third inner diameter and extends from the step 30C to the open end of the device sleeve portion 30B.

The medical device 26 comprises a housing 40 having a surrounding sidewall extending to a proximal annular rim 40A. The proximal rim 40A surrounds and defines an opening leading into the housing 40.

A printed circuit board (PCB) assembly 44 resides inside the device housing 40 with at least two terminal pins 42A and 42B connected to the PCB assembly extending outwardly through the proximal annular rim 40A of the device housing 40. The PCB assembly 44 supports at least one, and preferably a plurality of electronic components 46, that are connected to the terminal pins 42A and 42B. The PCB assembly controls the various functions performed by the active medical device 12. These include, but are not limited to, providing electrical stimulation to body tissue in which the active medical device 12 is implanted or to body tissue on which it is externally worn, and receiving sensed biological signals pertaining to functions of the body tissue in which the active medical device 12 is implanted or receiving sensed biological signals from body tissue on which it is externally worn. The active medical device 12 can also be configured to both provide electrical stimulation and sense biological signals to and from body tissue in which it is implanted or on which it is worn.

Preferably, the PCB assembly 44 also supports the previously described charging coil (not shown) connected to a charging circuit (not shown). The charging circuit is configured to convert RF or inductive energy signals received by the inductive charging coil from the external charging pad 20 connected to the external charger 14 (FIG. 2) into a direct current voltage to charge the electrical energy power source 24 to power the electronic components of the PCB assembly 44.

To electrically connect the electrical energy power source 24 to the medical device 26 to power the electronic components 46 supported on the PCB assembly 44, the flex circuit 28 is moved into the lumen formed by the sleeve 30. As previously described, the power source end and the device end of a first one of the electrical traces supported on the insulative substrate of the flex circuit 28 is connected to opposed holes extending through the substrate. The power source end of a second one of the electrical traces is connected to the bond tab 39 while the opposed end of the second trace is connected to a hole extending through the substrate. The hole connected to the first trace is electrically connected to the terminal pin 38 while the bond tab 39 of the second trace is electrically connected to the casing 32/lid 34. If the power source 24 is built having a case-negative design, the bond tab 39 is electrically connected to the negative polarity power source casing 32/lid 34.

The power source 24 can also have a case-positive design, in which case the terminal pin 38 has a negative polarity and the casing 32/lid 34 has a positive polarity. A case-neutral design is also contemplated for the power source 24. In this latter embodiment, the casing 32/lid 34 is electrically neutral and the GTMS 36 supports two terminal pins, one having a positive polarity connected to the cathode, the other a negative polarity connected to the anode. Further, the power source 24 preferably has a third terminal pin (not shown) that is connected to the charging coil of the medical device 26.

The holes at the opposite ends of the first and second electrical traces of the flex circuit 28 are configured to electrically connect to the terminal pins 42A and 42B extending outwardly from the PCB assembly 44 housed inside the medical device 26. The power source 24 is now electrically connected to the medical device 26.

As shown in FIGS. 4 and 5, a unique aspect of the present active medical device 12 is that the housing 40 for the medical device 26 is open at it proximal annular rim 40A. This means that to hermetically seal the power source 24 to the medical device 26, the second outer diameter of the device sleeve portion 30B is fit inside an outwardly extending portion of the medical device housing 40. In this position, the device sleeve portion 30B of the sleeve 30 butts up against the proximal annular rim 40A of the device housing 40. If the device housing 40 is of a metal material, for example, titanium, the sleeve 30 is hermetically connected to the housing 40 at this butt joint by laser welding the two parts together. An epoxy material can also be used to make this connection. On the other hand, if the device housing 40 is of a ceramic material, for example, alumina, the sleeve 30 is hermetically connected to the housing using a brazing process that is similar to that previously described with respect to hermetically connecting the sleeve 30 to the power source casing 32 made from a ceramic material.

Next, the proximal lumen section 30D inside the power source sleeve portion 30B of the sleeve 30 is fit over the lid 34 of the power source 24, abutting the proximal annular rim 32A of the casing 32. The lid 34 is received in the power source lumen section 30D with the annular rim of the sleeve 30 butted up against the annular rim 32A of the power source casing 32. The sleeve 30 is hermetically connected to the casing 32 at this butt joint by laser welding the two parts together. An epoxy material can also be used to make this connection.

As previously described with respect to FIGS. 4 and 5, the device housing 40 is not hermetically sealed at its proximal annular rim 40A. Instead, the proximal annular rim 40A provides open access into the device housing 40 and the PCB assembly 44. However, as shown in FIGS. 3A, 3B, with the sleeve 30 connected to the medical device 26 at the proximal annular rim 40A of the housing 40 and with the sleeve connected to the power source 24 adjacent to the lid 34 and GTMS 36, the active medical device 12 is a hermetically sealed assembly. In that respect, the sleeve 30 connected to the power source 24 and to the medical device 26 protects the GTMS 36 for the power source 24 from contact with body fluids and other environmental conditions that could adversely affect its hermetic integrity.

As further shown in FIGS. 3A, 3B, with the sleeve 30 hermetically sealing the active medical device 12, the flex circuit 28 comprising a flexible insulative substrate supporting the at least two or first and second electrical traces is folded up inside the sleeve 30. The electrical traces of the folded flex circuit 28 electrically connect the electrical energy power source 24 to the medical device 26 to thereby power the medical device 12 as an active medical device. The sleeve 30 also prevents body fluids, and the like, from contacting the flex circuit 28. Should the GTMS 36 or the flex circuit 28 be inadvertently contacted by body fluids and other environmental conditions, their structural integrity as well as the electrical connections of the flex circuit 28 to the power source 24 and to the PCB assembly 44 of the medical device 26 could be compromised.

In one embodiment of the present active medical device 12, the housing 40 for the medical device 26 is made from alumina and it supports spaced-apart ring-shaped electrodes 48 and 50. These electrode 48 and 50 are electrically connected to the PCB assembly 44 and are configured to provide current to body tissue and/or to sense electrical signals from body tissue in a 360° field about the ceramic housing 40. Alternately, the electrodes 48 and 50 can be at least two spaced-apart discrete electrodes. Since they are not ring-shaped, the discrete electrodes 52 and 54 are configured to provide current to body tissue and/or to sense electrical signals from body tissue in a radiating pattern that is substantially directly in front of them.

While two ring-shaped electrodes 48, 50 or two discrete electrode 52, 54 are shown in this exemplary embodiment of the active medical device 12, two electrodes of either a ring-shaped type or a discrete type is the minimum number that is needed for a functioning active medical device. However, it is contemplated that there can three, four, and possibly more ring-shaped or discrete electrodes comprising the active medical device 12. Moreover, while alumina is inherently insulative and therefore provides electrical isolation of the various electrodes from each other, if the medical device housing 40 is metallic, the electrodes must be supported on electrically insulative structures (not shown). That is so they will not short to the housing 40 or to each other, as is well known by those skilled in the art. Platinum is a suitable material for the electrodes 48, 50 and 52, 54.

The elongated shape of the active medical device 12 shown in FIGS. 2, 3A, 3B, 4 and 5 allows the implantation procedure to be performed by injecting or inserting the active medical device 12 into body tissue using an insertion tool, typically through a very small incision. With the active medical device 12 implanted in body tissue, the electrical power source 24 electrically connected to the PCB assembly 44 provides electrical power to the spaced-apart ring-shaped electrodes 48, 50 or discrete electrodes 52, 54. As ring-shaped members, the electrodes 48, 50 are configured to electrically stimulate body tissue or sense biological signals in a 360° field about the device housing 40. Alternately, the discrete electrodes 52, 54 do not extend completely around a perimeter of the device housing. Instead, these electrodes are configured to stimulate body tissue or sense biological signals in a field that is centered directly in front of them.

It is also within the scope of the present invention that the active medical device 12 can have both ring-shaped electrodes and discrete electrodes. While at least two electrodes are needed for a functioning device, there can be more than two electrodes of either a ring-shape or a discrete-shape. In any event, while the electrodes 48, 50 and 52, 54 are preferably powered by the electrical power source 24, they can also be powered through RF or inductive energy transmitted from the external charging pad 20 connected to the external charger 14 to the charging coil electrically connected to the PCB assembly 44. The PCB assembly supports electronic components that control the various functions of the medical device, including having the electrodes deliver electrical stimulation to a patient and sense biological signals from body tissue.

It is appreciated that various modifications to the inventive concepts described herein may be apparent to those skilled in the art without departing from the spirit and scope of the present invention as defined by the hereinafter appended claims.

What is claimed is:

1. An active medical device (AMD), comprising:
   a) an electrical energy power source, comprising:

9 i) a metallic power source casing having a casing proximal open end;
ii) a metallic lid welded to the proximal open end of the power source casing, the lid having an opening, wherein the lid welded to the casing serves as a first terminal for the power source; and
iii) a glass-to-metal seal (GTMS) comprising a ferrule welded to the lid in the lid opening, the ferrule supporting an insulator glass contacting at least/one terminal pin extending from the power source, the terminal pin serving as a second, opposite polarity terminal for the power source; and b) a medical device, comprising:
i) a ceramic housing having a housing distal end spaced from a housing proximal open end;
ii) a printed circuit board (PCB) assembly contained inside the ceramic housing, the PCB assembly comprising a printed circuit board supporting at least one electronic component that is configured to control functions of the AMD;
iii) at least two spaced-apart electrodes supported on the ceramic housing and being electrically connected to the PCB assembly; and
iv) at least two device terminal pins connected to the PCB assembly and extending outwardly through the ceramic housing proximal open end; and c) a flex circuit comprising a flexible and insulative substrate supporting at least a first electrical trace spaced from a second electrical trace, wherein the first and second electrical traces each extend from an electrical trace power source end to an opposed electrical trace device end;

d a metallic sleeve providing a lumen extending from a sleeve power source end to a sleeve device end, e) wherein the flex circuit at least partially resides in the sleeve lumen, the power source end of the first electrical trace is connected to the first terminal of the power source, the power source end of the second electrical trace is connected to the second terminal of the power source, and the device ends of the first and second electrical traces are connected to the at least two device terminal pins connected to the PCB assembly so that the power source is configured to provide electrical power to the at least one electronic component of the PCB assembly, and f) wherein the sleeve device end of the metallic sleeve is brazed to the ceramic housing adjacent to the housing open end, and the sleeve power source end is welded to the metallic power source casing adjacent to the lid to hermetically seal the AMD, and g) wherein the at least two spaced-apart electrodes electrically connected to the PCB assembly are configured to at least one of provide electrical stimulation and to sense biological signals to and from body tissue in which the AMD is implanted or on which the AMD is worn.

2. The active medical device of claim 1, selected from a cochlear implant, a piezoelectric sound bridge transducer, a neurostimulator, a brain stimulator, a brain sensor, a neurostimulator configured to stimulate the Vagus nerve, an optical sensor, a motion sensor, an acoustic sensor, a pressure sensor, an analyte sensor, an electromagnetic sensor, a cardiac pacemaker, a left ventricular assist device, an artificial heart device, an insulin drug pump, a chemotherapy drug pump, a pain medication pump, a bone growth stimulator, a urinary incontinence device, a spinal cord stimulator, an anti-tremor stimulator, an implantable cardioverter defibrillator, a congestive heart failure device, an external insulin pump, an external drug pump, an external neurostimulator, an external ventricular assist device, an EKG/ECG external skin electrode, and an EEG electrode that is configured for placement on the head.

3. The active medical device of claim 1, wherein the power source is selected from a capacitor, an alkaline cell, a primary lithium cell, a rechargeable lithium-ion cell, a Ni/cadmium cell, a Ni/metal hydride cell, a supercapacitor, and a thin film solid-state cell.

4. The active medical device of claim 1, wherein the at least two spaced-apart electrodes are not connected to or supported on the metallic power source casing.

5. The active medical device of claim 1, wherein the ceramic housing is comprised of alumina.

6. The active medical device of claim 1, wherein the at least two electrodes are made of platinum.

7. The active medical device of claim 1, wherein the at least two electrodes are individually selected from a ring-shaped electrode and a discrete electrode that is not ring-shaped.

8. The active medical device of claim 1, wherein the power source is a rechargeable power source, and further comprising a charging coil connected to a charging circuit contained inside the ceramic housing, wherein the charging circuit is configured to convert RF or inductive energy received from the charging coil into a direct current voltage to charge the rechargeable power source.

9. The active medical device of claim 1, wherein the power source end of the first electrical trace is connected to a first hole in the insulative substrate of the flex circuit, the first hole in turn being received on the at least one power source terminal pin of the GTMS, the power source end of the second electrical trace is connected to a bond tab supported on the insulative substrate of the flex circuit, the bond tab in turn being connected to the metallic lid or the metallic casing of the power source, and the device ends of the first and second electrical traces are connected to second and third holes in the insulative substrate, the second and third holes in turn being connected to a respective one of the at least two device terminal pins connected to the PCB assembly to thereby electrically connect the power source to the PCB assembly.

10. The active medical device of claim 1, wherein the at least two spaced-apart electrodes supported on the ceramic housing are ring-shaped and spaced proximally from the housing distal end to electrically stimulate body tissue or sense biological signals in a 360° field about the ceramic housing.

11. An active medical device (AMD), comprising:
a) a rechargeable electrical energy power source, comprising:
i) a metallic power source casing having a casing proximal open end;
ii) a metallic lid welded to the proximal open end of the power source casing, the lid having an opening, wherein the lid welded to the casing serves as a first terminal for the power source; and
iii) a glass-to-metal seal (GTMS) comprising an insulator glass contacting at least one power source terminal pin extending from the power source, the terminal pin serving as a second, opposite polarity terminal for the power source; and b) a medical device, comprising:
i) an alumina housing having a housing distal end spaced from a housing proximal open end;

ii) a printed circuit board (PCB) assembly contained inside the alumina housing, the PCB assembly comprising a printed circuit board supporting at least one electronic component that is configured to control functions of the AMD;
iii) at least two spaced-apart electrodes supported on the alumina housing and being electrically connected to the PCB assembly; and
iv) at least two device terminal pins connected to the PCB assembly and extending outwardly through the alumina housing proximal open end; and
c) a flex circuit comprising a flexible and insulative substrate supporting at least a first electrical trace spaced from a second electrical trace, wherein the first and second electrical traces each extend from an electrical trace power source end to an opposed electrical trace device end;
d) a titanium sleeve providing a lumen extending from a sleeve power source end to a sleeve device end,
e) wherein the flex circuit at least partially residing in the sleeve lumen, the power source end of the first electrical trace is connected to the first terminal of the power source, the power source end of the second electrical trace is connected to the second terminal of the power source, and the device ends of the first and second electrical traces are connected to the at least two device terminal pins connected to the PCB assembly so that the rechargeable power source is configured to provide electrical power to the at least one electronic component of the PCB assembly, and
f) wherein the sleeve device end is brazed to the alumina housing adjacent to the housing open end, and the sleeve power source end is connected to the titanium power source casing adjacent to the lid to hermetically seal the active medical device, and
g) wherein the at least two spaced-apart electrodes electrically connected to the PCB assembly are configured to at least one of provide electrical stimulation and to sense biological signals to and from body tissue in which the AMD is implanted or on which the AMD is worn.

12. The active medical device of claim 11, further comprising a charging coil connected to a charging circuit contained inside the ceramic housing, wherein the charging circuit is configured to convert RF or inductive energy received from the charging coil into a direct current voltage to charge the rechargeable.

13. The active medical device of claim 11, selected from a cochlear implant, a piezoelectric sound bridge transducer, a neurostimulator, a brain stimulator, a brain sensor, a neurostimulator configured to stimulate the Vagus nerve, an optical sensor, a motion sensor, an acoustic sensor, a pressure sensor, an analyte sensor, an electromagnetic sensor, a cardiac pacemaker, a left ventricular assist device, an artificial heart device, an insulin drug pump, a chemotherapy drug pump, a pain medication pump, a bone growth stimulator, a urinary incontinence device, a spinal cord stimulator, an anti-tremor stimulator, an implantable cardioverter defibrillator, a congestive heart failure device, an external insulin pump, an external drug pump, an external neurostimulator, an external ventricular assist device, an EKG/ECG external skin electrode, and an EEG electrode that is configured for placement on the head.

14. The active medical device of claim 11, wherein the titanium sleeve is connected to the power source casing by a weld or an epoxy material.

15. The active medical device of claim 11, wherein the at least two spaced-apart electrodes are not connected to or supported on the metallic power source casing.

16. The active medical device of claim 15, wherein the at least two electrodes are made of platinum.

17. The active medical device of claim 15, wherein the at least two electrodes are individually selected from a ring-shaped electrode and a discrete electrode that is not ring-shaped.

18. The active medical device of claim 11, wherein the power source end of the first electrical trace is connected to a first hole in the insulative substrate of the flex circuit, the first hole in turn being received on the at least one power source terminal pin of the GTMS, the power source end of the second electrical trace is connected to a bond tab supported on the insulative substrate of the flex circuit, the bond tab in turn being connected to the metallic lid or the metallic casing of the power source, and the device ends of the first and second electrical traces are connected to second and third holes in the insulative substrate, the second and third holes in turn being connected to a respective one of the at least two device terminal pins connected to the PCB assembly to thereby electrically connect the power source to the PCB assembly.

19. The active medical device of claim 11, configured to both provide electrical stimulation and sense biological signals to and from body tissue in which the AMD is implanted or on which the AMD is worn.

20. The active medical device of claim 11, wherein the at least two spaced-apart electrodes supported on the ceramic housing are ring-shaped and spaced proximally from the housing distal end to electrically stimulate body tissue or sense biological signals in a 360° field about the ceramic housing.

* * * * *